3,206,586
METHOD AND APPARATUS FOR WELDING A GRID FRAME
Leland L. Crane, Douglas G. Noiles, and Goliardo Miale, Bath, N.Y., assignors to Westinghouse Electric Corporation, East Pittsburgh, Pa., a corporation of Pennsylvania
Filed July 20, 1962, Ser. No. 211,277
14 Claims. (Cl. 219—58)

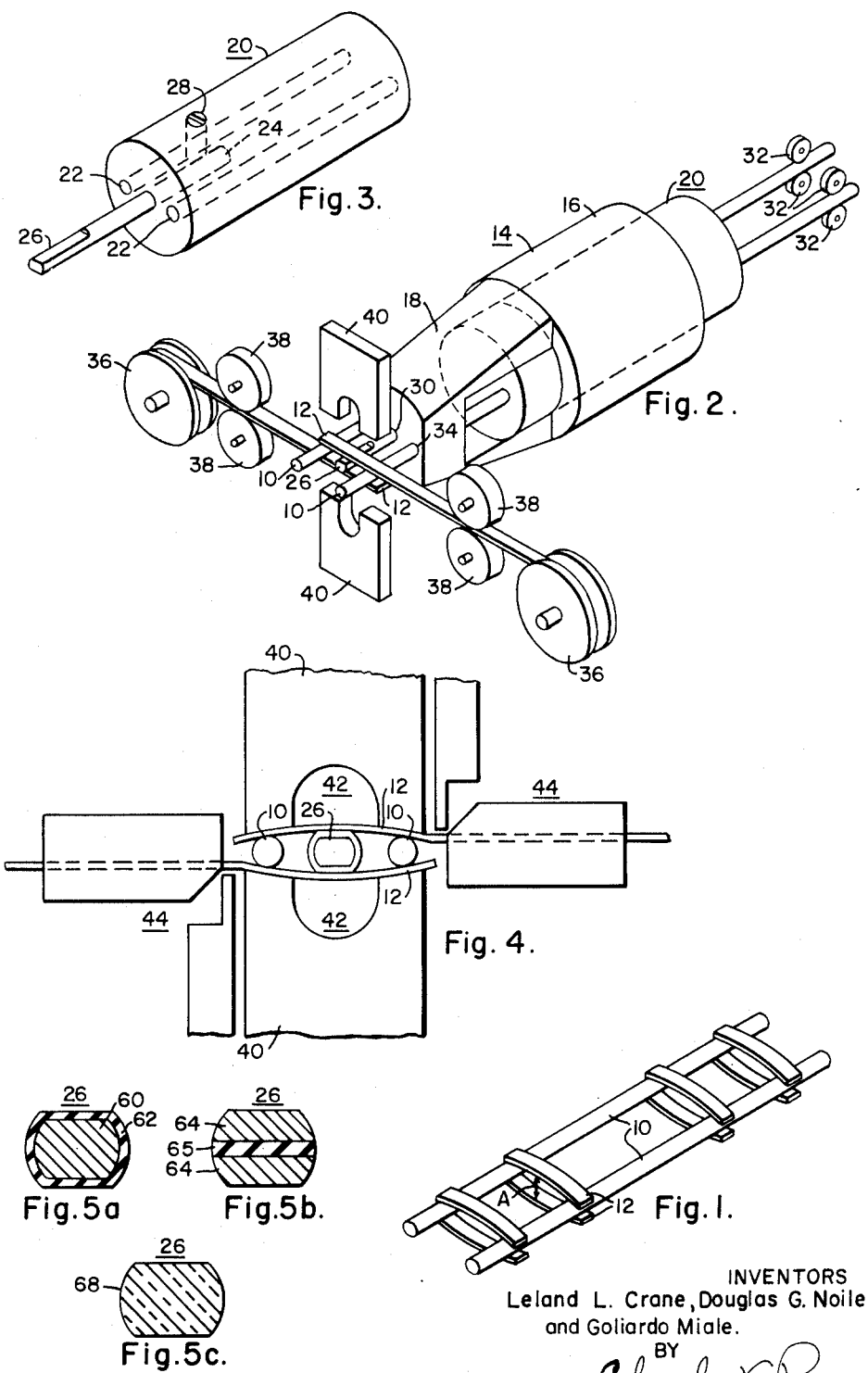
Sept. 14, 1965 — L. L. CRANE ETAL — 3,206,586
METHOD AND APPARATUS FOR WELDING A GRID FRAME
Filed July 20, 1962
INVENTORS
Leland L. Crane, Douglas G. Noiles
and Goliardo Miale.
BY
Charles F. Renz
ATTORNEY

United States Patent Office 3,206,586
Patented Sept. 14, 1965

The present invention relates generally to grid frames and more particularly to a method and apparatus for manufacturing grid frames of the type having a pair of spaced support or side rods with cross members extending therebetween.

In the manufacture of frame type grids, that is, grids having a pair of spaced side rods onto which are affixed cross members or bars extending in a direction transverse to the length of the side rods, there is generally provided two pairs of cross members, one pair being located near either end of the side rods. Each pair of cross bars is positioned such that one bar lies on either side of the side rods and that the two cross bars are in an opposed relationship. In practice, the side rod spacing, that is the center-to-center distance between side rods is controlled to tolerances of about ±0.002 inch and the rods are parallel. The spacing between a pair of cross bars is normally in the range of from 0.002 to 0.005 inch greater than the outside diameter of the side rods. This latter dimension is somewhat critical in that it is necessary to insert within this space the cathode assembly of the tube in which the grid is to be utilized. These grids are normally assembled by welding the cross bars to the side rods. As the side rods and cross members are generally of a material such as molybdenum, the welds are brittle and all of the above dimensions must be established before or at the time of welding. This is true because plastic manipulation of the assembled frame is not readily achievable.

In the manufacturing of frame grids of the type discussed here, the operation of winding the grid lateral wire on the frame is done subsequent to the frame welding operation and is not described here because several methods are common in the art.

Several factors contribute to the difficulty in welding together structures as have been described. If individual welding electrodes are used, that is, one electrode on either side of each support rod, it has been found that, due to the small dimension of the electrode and the intense heat generated during the welding process, there is a rapid erosion of the electrode. This necessitates frequent replacement of the electrodes and in many cases faulty welds due to uneven erosion of the electrodes. A second method entails the use of a larger electrode having a flat surface extending the full width between the two side rods. This method, however, has proven to be unsatisfactory as the dimension between the two cross bars was subject to rather large variances due to plastic deformation of the cross bars and side rods in welding.

It is, therefore, an object of this invention to provide an improved method and apparatus for the manufacture of frame type grid electrodes.

Another object is to provide improved means and apparatus for manufacturing frame grid frames wherein the spacing between cross bars is maintained at a prescribed minimum dimension.

A further object is to provide improved apparatus for the welding of grid frames which apparatus has long life and provides uniform welds.

A still further object is to provide an improved welding electrode and means whereby the cross bars of a frame type grid are uniformly spaced.

Stated briefly, the present invention provides that the ends of the welding electrodes in accordance with the present invention are substantially U-shaped. Two electrodes are provided in an opposed relationship and the legs of U-shaped electrodes are spaced so as to be aligned with the side rods. This construction provides that those portions of the cross bars extending between the two side rods are not in contact with an electrode surface. That is, the facing surfaces of the electrodes have two spaced contact areas and the surface intermediate these contact areas is recessed with respect thereto whereby this intermediate surface is not in contact with any material to be welded. Within the region between the two side rods, there is provided an electrically insulating member or mandrel which is positioned between the two cross bars and serves to maintain an accurate minimum distance therebetween. Thus, when the two electrodes are brought into position to form the weld between the cross bars and the side rods, the mandrel, positioned between the cross bars in the central portion of the U-shaped electrodes, serves to keep the cross bars spaced a minimum distance.

Further objects and advantages of the invention will become apparent as the following description proceeds and features of novelty which characterize the invention will be pointed out in particularity in the claims annexed to and forming a part of the specification.

For a better understanding of the invention, reference may be had to the accompanying drawings, in which:

FIGURE 1 shows a section of a frame grid strip made in accordance with the present invention;

FIG. 2 is a perspective view of the apparatus for making a grid in accordance with the present invention;

FIG. 3 is a perspective view of one of the components of the apparatus of FIG. 2;

FIG. 4 is an end view showing the welding electrodes and mandrel of the present invention in position for welding the assembly and including the cross bar cutting assembly which was omitted in FIG. 2 for reasons of clarity; and FIGS. 5a, 5b and 5c are end views, in section showing various embodiments of the mandrel of FIGS. 2, 3 and 4.

With reference now to FIG. 1, there is shown a section of a frame grid strip made in accordance with the present invention. The strip includes a pair of spaced side rods 10, which may be of a suitable material such as molybdenum and which are positioned parallel one to the other. The diameter of the side rods may vary in accordance with the needs of the particular grid but is typically 0.03 to 0.04 inch. Positioned on either side of the side rods 10 are cross bars 12. The cross bars 12 may also be made of molybdenum and may be in the form of ribbons having a cross section dimension consistent with the strength requirements of the grid frame structure. Sizes currently used are approxmiately 0.007 x 0.020 inch and 0.008 x 0.030 inch. The cross bars 12 are affixed to the side rods 10 in accordance with the present invention by resistance welding thereto. As shown in FIG. 1, the region between the more widely spaced pairs of cross bars 12 forms the active grid portion onto which the grid laterals are later wound, while the region between the closer spaced pairs of cross bars 12 forms the leg portions of successive grids when the side rods are cut between the closer spaced pairs of cross bars.

Although it is customary to form such grids in strips of convenient length comprising a plurality of such grid sections, it is understood that a single grid may be formed individually. As viewed in FIG. 1, dimension A, the dimension between opposing interior surfaces of a pair of cross bars 12, is the critical dimension which the present invention is designed to maintain.

In FIG. 2, there is shown an apparatus for forming frame grids in accordance with the preferred embodiment of the present invention. The apparatus includes a holder 14 having a body portion 16 and a guide portion 18. A centrally extending aperture through the body portion 16 permits the insertion thereinto of a side rod guide and mandrel holder 20. The side rod guide and mandrel holder 20, which may be best seen in FIG. 3, comprises a substantially, cylindrical body of suitable insulating material (Micarta a Westinghouse Electric Corporation trademark for a laminated plastic, nylon, etc.) having two parallel extending bores 22 extending the length thereof. The side rod guide and mandrel holder 20 also includes a third bore 24 extending part way into the guide 20 into which is fitted a mandrel 26 in accordance with the present invention. The mandrel 26 may be retained within the bore 24 through suitable means, for example a set screw 28. The side rod guide and mandrel holder 20 is disposed within the body portion 16 of the holder 14 and the mandrel 26 extends through and is insulated from an aperture 30 located in the guide portion 18 of the device 14.

In operation, the two side rods 10 are fed by suitable means such as rollers 32 (driven by suitable means not shown) through the bores 22 of the guide member 20 and then through suitable apertures 34 located within the guide portion 18 of the device 14. The bores 22 and apertures 34 and 30 are so aligned to provide that the axes of the two side rods and that of the mandrel all lie in the same plane. The side rods 10 may be simply rods of suitable length or, as is more common, may be supplied from a suitable source such as a spool. This spool has not been shown.

The cross bars 12 may be in the form of a ribbon which is fed from a direction transverse to the length of the side rods in a manner to provide that one ribbon goes above the side rods while the other ribbon goes beneath the side rods 10. The ribbon may be fed from a suitable source such as spools 36 and as shown in FIGS. 2 and 4, one ribbon is fed from each side of the side rods, although it is obvious that both ribbons may be fed from one side. Suitable rollers 38 (driven by means not shown) may be provided to supply the cross bar material to the work area.

Two welding electrodes 40 are provided in an opposed relationship in the region where the cross bars 12 and the side rods 10 meet. The electrodes 40 are of particular shape as will be discussed later and are provided with a reciprocal vertical motion by any suitable means. The electrodes 40 are also provided with a suitable source of potential to effect the weld of the cross bars 12 to the side rods 10 in a manner well known in the art. The desirable shape of the electrodes is best seen with respect to FIG. 4. As illustrated, the electrodes 40 are substantially identical and are of generally U-shaped configuration. The leg portions of the U-shaped electrodes 40 are relatively heavy having the dimension along the length of the cross bars 12 somewhat greater than the diameter of the side rods 10 and the dimension along the length of the side rods 10 somewhat greater than the width of the cross bars 12. Although essentially the same welding function could be achieved by using four separate electrodes it has been found that the configuration such as shown in FIGS. 2 and 4 is better from a practical standpoint in that the greater mass of material present provides a heat sink. This heat sink alleviates the rapid deterioration of the electrode surfaces which is prevalent in the case of four small individual electrodes.

It is necessary that each of the electrodes 40 be provided with the removed or central section forming the U 42 in order to maintain a minimum distance between the cross bars 12. This distance is maintained, as has been stated, by providing within this space a mandrel 26 which is of accurate dimensions and which provides an electrically insulating body between the two cross bars 12 as will be more fully explained later.

In operation, the side rods 10 and cross bars 12 are fed into proper position around the mandrel 26 and the welding electrodes 40 are then brought into position so as to contact the cross bars 12. Then, upon the application of a suitable potential to the electrodes 40 the cross bars 12 are resistance welded to the side rods 10 to form a rigid structure with the mandrel 26 serving to maintain accurate spacing between the cross bars 12. After the weld has been preformed, the cross bars 12 are severed by suitable shear means 44 which are located closely adjacent to the electrodes 40 and hence close to the point of welding (the shearing means 44 have been omitted from FIG. 2 for purposes of clarity). After two cross bars 12 have been welded to the side rods 10, the electrodes 40 are retracted and additional side rod material and cross bar material is fed beneath the electrodes 40 so that the next pair of cross bars may be affixed to the side rods 10. Thus there is provided a strip of convenient length having a series of grid frames. It may also be desirable that the free ends of the side rods 10 are gripped by suitable means whereby the free end of the grid strip is supported.

As has been previously stated, the mandrel 26 must provide an electrically insulating body between the two cross bars 12. This is necessary to prevent shunt electrical currents from one cross member 12 to the second cross member 12 in paths other than through the side rods 10; for example, current would flow through the mandrel if it were conductive. If these shunt currents are permitted, the result may be a poor quality weld between the cross bars and the side rods 10 and even perhaps a welding of the cross bars 12 to the mandrel 26. In FIGS. 5a, 5b and 5c there are shown, in section, the end views of three embodiments of the mandrel 26. In FIG. 5a, the mandrel 26 includes a central core 60 which is of suitable material such as steel to which has been applied a coating of a suitable insulating material having good mechanical strength, for example, aluminum oxide. The aluminum oxide layer 62 may be flame plated to the steel core 60.

In FIG. 5b, a laminated type structure is shown with the outer laminations 64 being of a suitably hard material such as steel having placed therebetween a suitable insulating layer 65 of a material such as mica.

The embodiment of FIG. 5c is a one piece construction 68 in which the entire mandrel is of a suitably hard insulating material such as industrial sapphire. Any of these embodiments will provide suitable mandrel means for a particular purpose. The important feature in each being that there is no electrically conductive path directly through the mandrel and that the surface of the mandrel, which is subject to large amounts of abrasion in the grid making process, be sufficiently hard to withstand this abrasion. The mandrel must also not be so brittle that it breaks when the compression force of the electrodes is applied to the cross bars 12.

In addition, the cutter assemblies 44, ribbon spools 36 and feed rollers 38 are electrically insulated from all other parts of the machine as are the electrodes 40 and their associated mechanism.

Thus it is seen that there is provided by the present invention an apparatus and method by which a grid frame may be easily and readily manufactured and in which the dimensions are readily maintained with high accuracy.

While there have been shown and described what are at present considered to be the preferred embodiments of the invention, modifications thereto will readily occur to those skilled in the art. For example, rather than the rectangular type structure for the electrodes 40 it is readily apparent that the electrode could take on any other suitable configuration such as circular.

It is not desired, therefore, that the invention be limited to the specific arrangement shown and described and it is intended to cover in the appended claims all such modifications as fall within the true spirit and scope of the invention.

We claim as our invention:

1. An assembly for welding a grid frame of the type having spaced support rods and cross bars extending between said support rods comprising first and second electrodes disposed in an opposed relationship, each of said electrodes being substantially U-shaped and of dimensions such that the legs of said electrodes are aligned with said support rods and spacing means disposed between said cross bars whereby the spacing therebetween is maintained at a prescribed minimum.

2. An assembly for welding a grid frame of the type having spaced support rods and cross bars extending between said support rods comprising first and second electrodes disposed in an opposed relationship, each of said electrodes having two spaced contact areas in alignment with said support rods and a surface intermediate said areas, said surface being recessed with respect to said contact areas, and spacing means positioned between said cross bars whereby the spacing therebetween is maintained at a predescribed minimum, said spacing means providing an electrically insulating body between said cross bars.

3. An assembly for the manufacture of grid frames of the type having a pair of spaced side rods with cross bars extending therebetween comprising means for advancing and maintaining said side rods in a spaced relationship, means for positioning said cross bars transversely to the length of said side rods, electrode means for welding said cross bars to said side rods, said electrode means comprising members having two spaced contact areas in alignment with said rods and a surface intermediate these areas, said intermediate surface being recessed with respect to said contact areas whereby said surface does not contact any material to be welded, and mandrel means insertable between said cross bars within the region between said side rods whereby the spacing between said cross bars is maintained at a prescribed minimum, said mandrel means providing an electrically insulating body between said cross bars.

4. An assembly for the manufacture of grid frames of the type having a pair of spaced side rods with cross bars extending therebetween comprising means for advancing and maintaing said side rods in a spaced relationship, means for positioning said cross bars transversely to the length of said side rods, electrode mean positionable in contact with said cross bar for welding said cross bars to said side rods, said electrode means comprising substantially U-shaped members having their leg portions in alignment wtih said side rods and their central portions in substantial alignment with the spacing between said side rods, and mandrel means positioned between said cross bars within the region between said side rods whereby the spacing between said cross bars is maintained at a prescribed minimum, said mandrel means providing an electrically insulating body between said cross bars.

5. An assembly for the manufacture of grid frames having a pair of spaced side rods and cross bars extending between said side rods comprising means for supporting said side rods in a spaced relationship, means for positioning said cross bars in an opposed relationship on opposite sides of said side rods and transversely to the length thereof, a pair of welding electrodes movable into contact with said cross bars, each of said electrodes comprising first and second contact areas in alignment with said side rods and a recessed portion between said contact areas whereby only said contact areas are in contact with material to be welded, and spacing means positioned between opposed cross bars whereby the spacing therebetween is maintained at a prescribed minimum, said spacing means providing an electrical insulating body between said cross bars.

6. An assembly for the maunfacture of grid frames having a pair of spaced side rods and cross bars extending between said side rods comprising means for feeding said side rods from a first direction, means for supporting said side rods in a spaced relationship, means for positioning said cross bars in an opposed relationship with respect to one another on opposite sides of said side rods and transversely to the length thereof, a pair of welding electrodes movable into contact with said cross bars, each of said electrodes comprising first and second contact areas in alignment with said side rods and a recessed portion between said contact areas whereby only said contact areas are in contact with material to be welded, and spacing means positioned between said opposed cross bars within the region between said side rods whereby the spacing therebetween is maintained at a prescribed minimum, said spacing means providing an electrical insulating path between said cross bars.

7. A method of manufacturing a grid electrode for electron discharge devices of the type having a pair of spaced support rods and cross bars extending between said support rods comprising the steps of supporting said support rods in a spaced relationship, positioning one cross bar on each side of said side rods in an opposed relationship, maintaining the space between said cross bars in the region between said support rods at a prescribed dimension, maintaining the cross bars in an insulated relationship from each other, and simultaneously welding each of said cross bars to each of said side rods through the use of a pair of opposed substantially U-shaped electrodes having the legs thereof spaced a distance substantially equal to the spacing between said support rods.

8. A method of manufacturing a grid electrode for electron discharge devices of the type having a pair of spaced side rods and cross bars extending between said side rods comprising the steps of advancing said side rods from a first direction, supporting said side rods in a spaced relationship, advancing a first of said cross bars in a first direction and a second of said cross bars from a second direction whereby one cross bar is positioned on each side of said side rods in an opposed relationship, maintaining the space between said cross bars in the region between said side rods at a prescribed minimum through the use of an electrically insulating spacing member positioned between said cross bars whereby said spacing member comprises a non-conducting electrical region between said cross bars, and simultaneously welding each of said cross bars to each of said side rods through the use of a pair of opposed substantially U-shaped electrodes having the legs thereof spaced a distance substantially equal to the spacing between said side rods.

9. An assembly for the manufacture of grid frames of the type having a pair of spaced side rods and cross bars extending between said side rods whereby said side rods are maintained in their spaced relationship comprising guide means having two longitudinally extending, spaced bores extending therethrough, means for advancing said side rods through said bores whereby said side rods are maintained in a spaced relationship, means for positioning cross bars tranversely to the length of said side rods, one on either side of said side rods, a pair of substantially U-shaped welding electrodes for welding said cross bars to said side rods having the leg portions thereof spaced a distance substantially equal to the spacing between said side rods, said electrodes being positioned opposed to each other and being movable into contact with said cross bars whereby said cross bars are welded to said side rods, and mandrel means disposed within the region defined by said side rods and said cross bars whereby said cross bars are maintained a minimum distance apart, said mandrel means providing an electrically non-conductive region between said cross bars.

10. An assembly for welding a grid frame of the type having a pair of spaced side rods, and first and second cross bars fixed upon opposite sides of and extending between said side rods, said assembly comprising a plurality of electrodes disposed transverse of said frame grid in opposed relationship with each other, said electrodes providing areas so spaced from each other to provide contacts for welding said cross bars to each of said side rods, and spacing means disposed between and in abutting relationship with said first and second cross bars to thereby determine the distance between said first and second cross bars, said spacing means providing an electrical insulation between said first and second cross bars.

11. An apparatus for welding a grid frame of the type having a pair of spaced side rods and cross bars fixed upon both sides of and extending between said side rods, said apparatus comprising a pair of electrodes disposed in an opposed relationship with each other, each of said electrodes having two areas so spaced to provide contacts for welding at least one of said cross bars to each of said side rods, and a surface intermediate said areas, said intermediate surface being recessed with respect to said areas, and a mandrel means disposed between said side rods and upon an opposite side of said cross bars from one of said electrodes to abut against a portion of said cross bars intermediate said side rods to define the distance between said cross bars.

12. An assembly for welding a grid frame substantially as claimed in claim 10 wherein said spacing means comprises a steel core with a coating of aluminum oxide thereon.

13. An assembly for welding a grid frame substantially as claimed in claim 10 wherein said spacing means comprises a plurality of laminations of steel and a layer of mica inserted between said laminations.

14. An assembly for welding a grid frame substantially as claimed in claim 10 wherein said spacing means comprises a unitary member of sapphire.

References Cited by the Examiner

UNITED STATES PATENTS

| | | | |
|---|---|---|---|
| 1,305,690 | 6/19 | Coyer | 219—56 |
| 2,379,135 | 6/45 | Ekstedt et al. | 219—56 X |
| 3,056,883 | 10/62 | Eisenburger et al. | 219—56 X |

FOREIGN PATENTS 342,920  1/60  Switzerland.

RICHARD M. WOOD, *Primary Examiner.*

MAX L. LEVY, *Examiner.*